(12) United States Patent
Bosma

(10) Patent No.: US 8,001,930 B2
(45) Date of Patent: Aug. 23, 2011

(54) SYSTEM AND METHOD FOR MILKING ANIMALS

(75) Inventor: Epke Bosma, Hölö (SE)

(73) Assignee: Delaval Holding AB, Tumba (SE)

( * ) Notice: Subject to any disclaimer, the term of this patent is extended or adjusted under 35 U.S.C. 154(b) by 421 days.

(21) Appl. No.: 12/223,008

(22) PCT Filed: Jan. 31, 2006

(86) PCT No.: PCT/SE2006/000139
§ 371 (c)(1),
(2), (4) Date: Sep. 19, 2008

(87) PCT Pub. No.: WO2007/089174
PCT Pub. Date: Aug. 9, 2007

(65) Prior Publication Data
US 2009/0084318 A1   Apr. 2, 2009

(51) Int. Cl.
*A01J 5/01* (2006.01)
(52) U.S. Cl. .................................................. 119/14.43
(58) Field of Classification Search ............... 119/14.43, 119/14.44, 14.02, 14.03
See application file for complete search history.

(56) References Cited

U.S. PATENT DOCUMENTS

| | | | | |
|---|---|---|---|---|
| 3,811,467 A | * | 5/1974 | Jones | 137/494 |
| 3,958,584 A | * | 5/1976 | Jones | 134/56 R |
| 4,616,215 A | * | 10/1986 | Maddalena | 340/626 |
| 4,941,433 A | * | 7/1990 | Hanauer | 119/14.02 |
| 5,954,846 A | * | 9/1999 | Chowdhury et al. | 55/385.1 |
| 6,644,239 B1 | * | 11/2003 | Aberg et al. | 119/14.44 |
| 6,796,271 B2 | * | 9/2004 | van den Berg | 119/14.43 |
| 7,117,815 B2 | * | 10/2006 | van den Berg et al. | 119/14.08 |
| 2003/0226511 A1 | * | 12/2003 | van den Berg et al. | 119/14.02 |
| 2003/0226512 A1 | * | 12/2003 | van den Berg | 119/14.43 |
| 2004/0094096 A1 | * | 5/2004 | Fransen et al. | 119/14.43 |
| 2008/0041315 A1 | * | 2/2008 | Stellnert et al. | 119/14.02 |

FOREIGN PATENT DOCUMENTS

| | | |
|---|---|---|
| EP | 1 369 033 | 12/2003 |
| WO | WO 03/045133 | 6/2003 |

* cited by examiner

*Primary Examiner* — Yvonne R. Abbott
(74) *Attorney, Agent, or Firm* — Harness, Dickey & Pierce, P.L.C.

(57) ABSTRACT

A system for milking animals comprises a plurality of milking machines (107), a common vacuum source arrangement (102-105), and a vacuum conduit system (101, 106*a-l*) connecting each of said milking machines to the common vacuum source arrangement, wherein each of the milking machines is connected to the common vacuum source arrangement via an air flow regulation device (108). Preferably, the common vacuum source arrangement comprises at least one vacuum pump (103-105) and a header tank (102), and each of the air flow regulation devices is provided to regulate the air flow from the milking machine, to which it is connected, to be lower than a threshold value.

12 Claims, 3 Drawing Sheets

SYSTEM AND METHOD FOR MILKING ANIMALS

TECHNICAL FIELD

The present invention relates to a system for milking animals comprising a plurality of milking machines, a common vacuum source arrangement, and a respective vacuum conduit connecting each of the milking machines to the common vacuum source arrangement. The invention relates also to a method for milking animals in such a milking system.

BACKGROUND OF THE INVENTION

In modern automatic milking farms vacuum pumps supply vacuum to the milking machine for performing necessary tasks, such as milking and cleaning.

In robot milking each milking station has conventionally been equipped with its own dedicated vacuum pump. In milking farms using many milking stations this is not an optimal solution and various solutions has been suggested for using a common vacuum source arrangement for supplying vacuum to a plurality of milking stations.

In larger automatic robotic milking farms two or more automatic milking stations may be serving a herd of milking animals. The automatic milking stations will then have a common total vacuum requirement, for which the vacuum pumps need to be dimensioned. Furthermore, such milking machines operate in different operating modes, such as milking, teat cleaning, milking machine cleaning, and stand-by to mention a few. Each of these modes has individual vacuum requirements, wherein for instance during cleaning of the milking machine a high air flow may occur, whereupon the vacuum level drops, whereas during milking a steady high vacuum level is required. Thus, the vacuum pumps need to be dimensioned to handle a situation where all milking machines are in the worst operating mode for vacuum supplying purposes. Milking machine cleaning may in turn include a number of different cleaning steps, such as cleaning of teat cups, cleaning of teat cleaning cups, cleaning of conduits, pre-rinsing, cleaning, post-rinsing, drying, etc. Milking machine cleaning may typically be divided into a short rinsing of teat cups and conduits, which may be conducted between the milking of each animal, and cleaning of the entire milking machine, which might be performed only once, twice or three times a day.

Assuming for instance that milking machine cleaning may result in such a high air flow as 500 litres/minute, during which the vacuum level may drop to approximately 30 kPa, and that milking requires a steady vacuum of 45 kPa and may result in air-flows of 150 liters/minute. Then, for a system comprising two milking machines being served by one single vacuum pump, the pump needs to be dimensioned to provide a steady vacuum of 45 kPa at an air flow of 650 liters/minute but also to provide an approximate vacuum level of 30 kPa at an air flow of 1000 liters/minute.

However, milking machine cleaning is only occasionally performed at both the milking machines at the same time, but typically different tasks are performing at the milking machines, where one may be less requiring for the vacuum pump. Thus, the vacuum pump has typically to be dimensioned for a situation, which will not occur very often. A vacuum pump dimensioned accordingly will of course be expensive both in purchase and in operation.

In very large farms with a large number of milking machines, where each milking machine is supplied with vacuum from a common vacuum source arrangement it is not economically feasible to dimension the common vacuum source arrangement for the worst possible situation, for instance the situation where nine milking machines are cleaned, causing high air flows into the vacuum system, while one milking machine is used for milking requiring a steady high vacuum level.

EP 1 369 033 discloses a milking system comprising a common vacuum source arrangement and a common ring line, to which at least two milking robots are connected. The common ring line has a first vacuum level and the individual milking robots have a second lower vacuum level controlled by a control means and a valve.

SUMMARY OF THE INVENTION

It is a main object of the present invention to provide a system and a method for milking animals that alleviate the above problems.

It is in this respect a particular object of the invention to provide such a system and such a method that enable the use of a common vacuum source arrangement for supplying vacuum to several different milking machines, where each milking machine may have different requirements with regard to vacuum level and air flow.

It is still a further object of the invention to provide such a system and such a method that control the air flow from a milking machine connected to a common vacuum source arrangement.

These objects among others are, according to a first aspect of the present invention, attained by a system for milking animals comprising a plurality of milking machines, a common vacuum source arrangement, and a vacuum conduit system connecting each of the milking machines to the common vacuum source arrangement, wherein each of the milking machines is connected to the common vacuum source arrangement via a respective air flow regulation device.

The above objects among others are, according to a second aspect of the invention, attained by a method for milking animals in a milking system comprising a plurality of milking machines, a common vacuum source arrangement, and a vacuum conduit system connecting each of said milking machines to said common vacuum source arrangement, the method comprising the steps of detecting the air flow from each of the milking machines and controlling the air flow from each of the milking machines in response to the respective detected air flow.

Preferably, the air flow from each of the milking machines is controlled to be lower than a threshold value. Thus, the air flow regulation device restricts the air flow from the milking machine to a maximum air flow.

According to one embodiment of the invention the milking machine is provided with a milking robot for automatically attaching teat cups to the teats of an animal prior to milking. Other milking machines are also conceivable.

According to a further embodiment of the present invention the common vacuum source arrangement comprises at least one vacuum pump and a header tank, and the vacuum conduits are connected to the header tank. The header tank provides a vacuum buffer means so that a steady vacuum may be provided.

According to yet a further embodiment of the invention each of the milking machines is arranged to operate in one state selected from a set of different states having different vacuum requirements independently of the state of operation of other ones of the milking machines. The set of different operation states may include milking, teat cup cleaning and milking machine cleaning states.

In one embodiment each of the air flow regulation devices comprises a fixed flow restrictor, a vacuum sensor arranged upstream of the fixed flow restrictor and provided for sensing the vacuum level, and a valve provided for controlling the air flow from the milking machine in response to the vacuum level sensed by the vacuum sensor. By these provisions a particularly simple and inexpensive air flow regulation device is achieved.

In another embodiment each of the air flow regulation devices comprises a flow sensor provided for sensing the air flow from the milking machine, to which it is connected, and a valve provided for controlling the air flow in response to the flow sensed by the flow sensor.

Further characteristics of the invention and advantages thereof, will be evident from the detailed description of embodiments of the present invention given hereinafter and the accompanying FIGS. 1 to 5, which are given by way of illustration only and thus, are not limitative of the present invention.

In the following detailed description the animals are cows. However, the invention is not limited to cows, but is applicable to any animals having the capability of producing milk, such as sheep, goats, buffaloes, horses, etc.

DETAILED DESCRIPTION OF EMBODIMENTS

Figure 1:
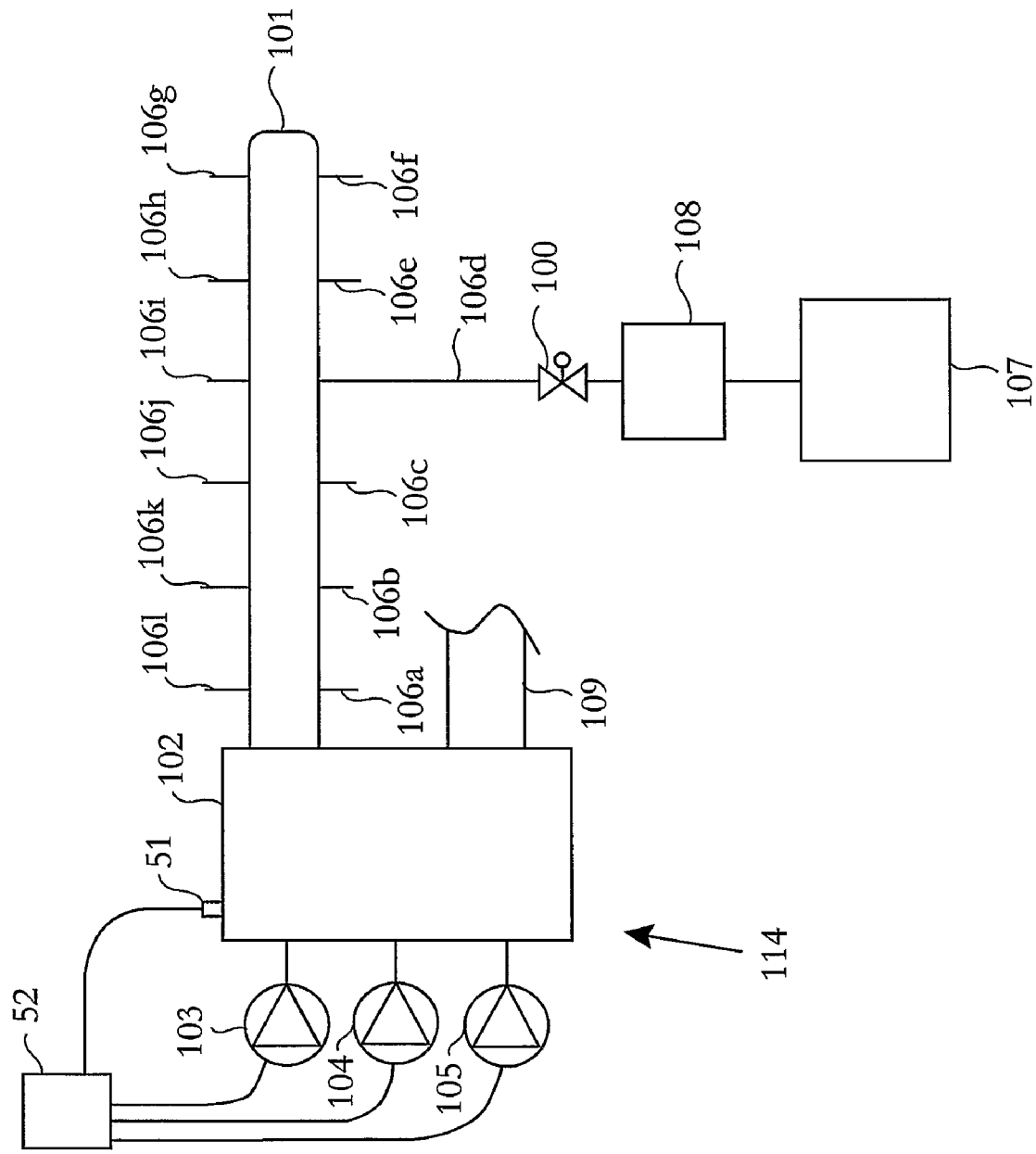
FIG. 1 is a schematic drawing of a milking system according to an embodiment of the present invention.

FIG. 1 is a schematic drawing of a milking system according to one embodiment of the invention. A common ring line 101 is connected to a header tank 102. The header tank 102 comprises three vacuum pumps 103, 104 and 105, preferably frequency control pumps, for supplying vacuum to the header tank 102 and the common ring line 101. The vacuum pumps 103, 104 and 105 together with the header tank 102 are denoted a common vacuum source arrangement 114. The header tank 102 may of course be provided with more or fewer vacuum pumps according to the needs of the actual implementation, for instance the number of milking machines connected to the common ring line 101 may affect the number of pumps needed and their capacity.

A vacuum sensor 51 is provided for measuring the vacuum level in the header tank 102. The vacuum pumps 103, 104 and 105 and the vacuum sensor 51 are connected to a control device 52, which is responsible for controlling the common vacuum source arrangement 114.

WO 03/045133 discloses a vacuum pump arrangement that may, partly or in its entirety, be used in the present invention. The contents of WO 03/045133 are hereby incorporated by reference.

The common ring line 101 supplies vacuum via milking machine connections 106a to 106l. In the present embodiment the common ring line 101 comprises twelve connections for connecting twelve milking machines to the common ring line 101, one of which being shown in FIG. 1 as detail 107. The milking machine 107 may for instance be provided with a commonly known milking robot in which one or several milking animals may be milked. The milking machine 107 uses vacuum for milking the animals and for performing other animal related tasks. The vacuum is supplied by the vacuum pumps 103, 104 and 105 and supplied to the milking machine 107 via the common ring line 101, the milking machine connection 106, a shut-off valve 100, and an air flow regulation device 108. One characteristic feature of the milking machine 107 is that it uses vacuum for other purposes than milking, such as teat cleaning, teat cup cleaning, and rinsing, cleaning and drying of the entire milking machine, which other purposes may have other requirements regarding vacuum level and air flow.

The vacuum pumps in FIG. 1 are capable of maintaining a high air flow. Examples different operating modes, in which each of the milking machines may operate at a given instant are given in Table 1 below. Different operation modes require quite different vacuum levels and cause quite different air flows into the vacuum system.

TABLE 1

Milking machine modes

| Mode | Function | Vacuum req. |
| --- | --- | --- |
| 0 | Off | No Vacuum |
| 1 | Milking | Required vacuum level = 45 kPa. Low air flow ~150 l/min |
| 2 | Teat Cleaning | Required vacuum level < 45 kPa. High air flow ~1000 l/min |
| 3 | Cleaning of milking machine | Required vacuum level < 45 kPa. High air flow ~500 l/min |
| 4 | Maintenance | Low. Very low air flow ~20 l/min |

In mode 0 the milking machine is switched off and consequently no vacuum is required.

In mode 1 a milking animal is milked and it is required, for instance due to animal health, but also to achieve a good milking result, that the vacuum level is kept steady at the specified level of e.g. 45 kPa. During milking the air flow is relatively low, approximately 150 liters/minute. It should be noted however, as is well known by a person skilled in the art, that the vacuum level may be intentionally changed during milking for different purposes, such as achieving a gentler milking. Maintaining the selected vacuum level is however always important so that no large unintentional changes of the vacuum level occur.

In mode 2 teat cleaning is performed, causing a high air flow of e.g. 1000 liters/minute. In known milking systems, where each milking machine comprised its own vacuum pump, the dedicated vacuum pump was normally set to maintain 45 kPa, but due to the high air flow the pump was unable to maintain the vacuum level, which then fell to approximately 30 kPa. This was known and accepted since the specific vacuum level during this mode was not important. Obviously, according to the present milking system, it is not possible to control the individual vacuum pump since the milking machine 107 has no dedicated vacuum pump and it may very well be that another milking machine situated on the same common ring line 101 may be in mode 1, that is performing milking with specific requirements for the vacuum level.

It would of course be possible to dimension the total capacity of the vacuum pumps connected to the header tank 102 to be able to cope with the situation where all milking machines is in mode 2, and still maintaining 45 kPa vacuum, but this would be a very uneconomical solution, since this would require very large vacuum pumps for a situation that would occur extremely seldom. As is indicated in FIG. 1 a further common ring line 109, similar to the common ring line 101, comprising further milking machines would make the situation even worse. Instead each milking machine is provided with the flow regulation valve 108, to be described further below, according to the invention.

In some installations a teat cleaning cup is used, wherein water and pressurized air is introduced into the cup to clean the teat, and where the water is removed using vacuum in the teat cleaning cup. This will result in the above mentioned large air flow. Alternatively, other means may be used to clean teats, such as brushes etc, which may not require any vacuum.

In mode 3 the milking machine is washed and air flow may reach approximately 500 liters/minute.

In mode 4 the milking machine is in a maintenance mode. For a robotic automatic milking machine this could for instance be when the milking machine is waiting for a new animal to enter the milking machine. The air flow is typically low, approximately 20 liters/minute.

The milking machines connected to the common ring line 101 are operating completely independent of each other, so that each milking machine may operate in any mode independent of the operation mode of the other milking machines.

The air flow regulation device 108 is according to the invention provided to regulate the air flow from the milking machine, to which it is connected, to be lower than a threshold value. This means that during operation modes which caused large vacuum drops, the invention reduces the air flow into the vacuum system. The vacuum drop in the milking machine is not crucial when it is in any of modes 2 or 3.

Figure 2:
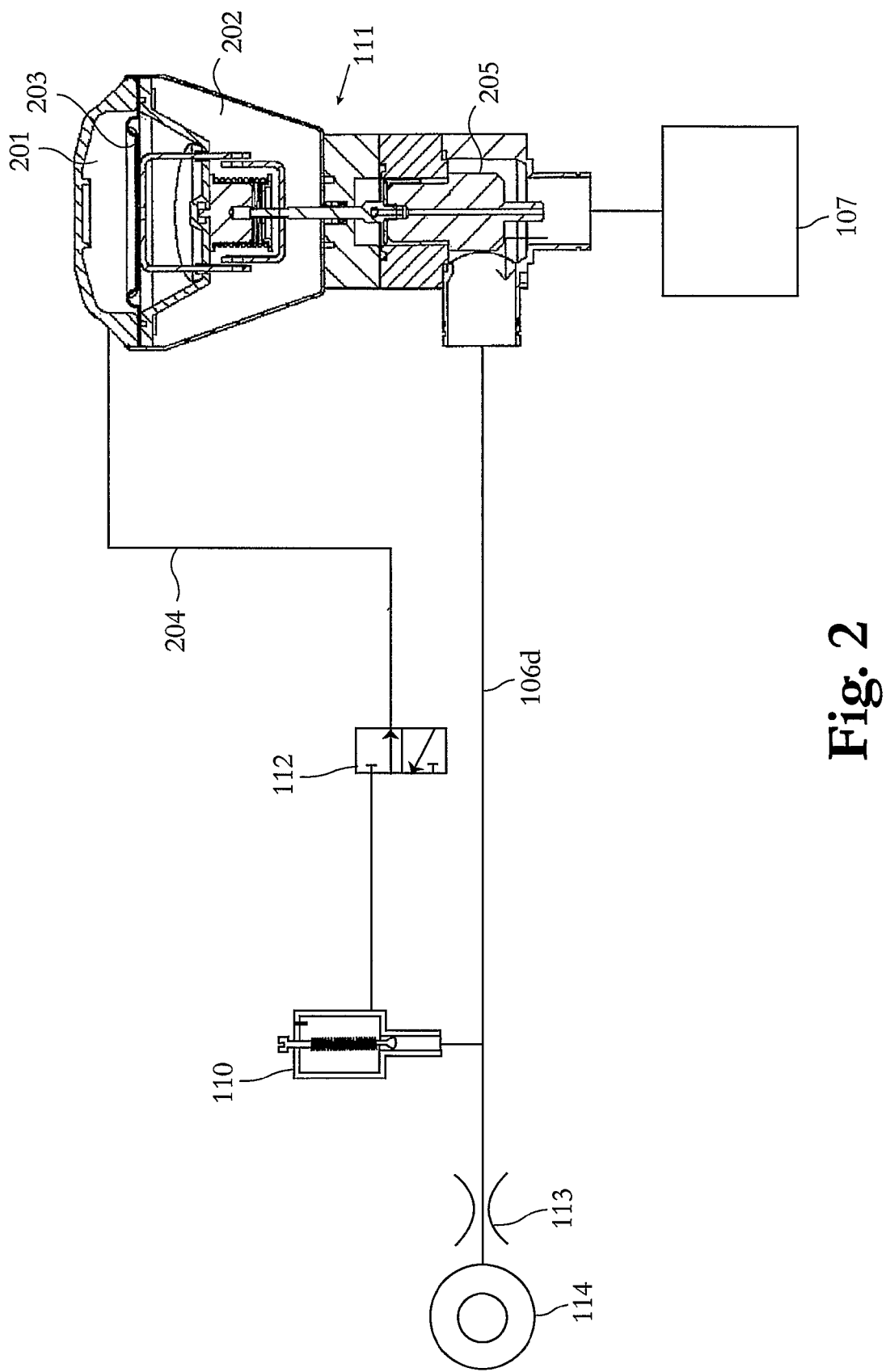
FIG. 2 is a schematic drawing of an air flow regulation device of the invention.

FIG. 2 shows an embodiment of the air flow regulation device 8. A fixed flow restrictor 113 is arranged in the milking machine conduit 106d, a vacuum sensor 110 is arranged upstream of the fixed flow restrictor 113 and is provided for sensing the vacuum level, and a valve 111 is provided for controlling the air flow from the milking machine 7 in response to the vacuum level sensed by the vacuum sensor 110.

The valve 111 is a vacuum controlled valve and is arranged upstream of the fixed flow restrictor 113 and of the vacuum sensor 107. The valve 111 has an upper 201 and a lower 202 compartment divided by a flexible membrane 203. The upper compartment 201 is connected to the vacuum sensor 110 via a vacuum conduit 204 and a shut-off valve 112. A piston 205 is arranged in the lower compartment 202 and may be moved vertically up and down depending on the position of the flexible membrane 203 to thereby open and close a passageway from the milking machine 107 to the milking machine conduit 106d.

The vacuum sensor 110 controls the vacuum in the vacuum conduit 204, and thus in the upper compartment 201 of the valve 111, in response to the vacuum in the milking machine, conduit 106d.

If appropriately dimensioned, a too large vacuum drop in the milking machine 107 caused by admitting a large air flow into the milking machine conduit 106d will cause the sensor to reduce the vacuum in the vacuum conduit 204 and in the upper compartment 201 of the valve 111, which in turn will cause the flexible membrane 203 to act on the piston 205 to reduce the passageway from the milking machine 107 to the milking machine conduit 106d. Hereby the air flow into the milking machine conduit 106d is reduced and the vacuum level in the milking machine conduit 106d is reduced. Continuous operation of the air flow regulation device will result in that a steady state with a stabilized air flow into the milking machine conduit 106d and with a stabilized vacuum level in the milking machine conduit 106d.

The air flow regulation device 108 may be tuned so that the combination of the common vacuum source arrangement 114, which by itself has a large air flow capacity, possibly over 10000 liters/minute, and the air flow regulation device 108 simulate a standard vacuum pump used for a stand-alone milking machine, having an air flow capacity of approx. 1000 liters/minute at 30 kPa.

Thus, an arrangement without the air flow regulation device would have tried to maintain the vacuum level in the milking machine 107 with large corresponding air flows even when the vacuum level need not to be maintained, while the system of the invention with the air flow regulation device 108 restricts the air flow from the milking machine 107 and correspondingly allows the vacuum level in the milking machine 107 to drop, without affecting the vacuum level or air flow at any other milking machine connected to the common ring line 101.

Figure 3:
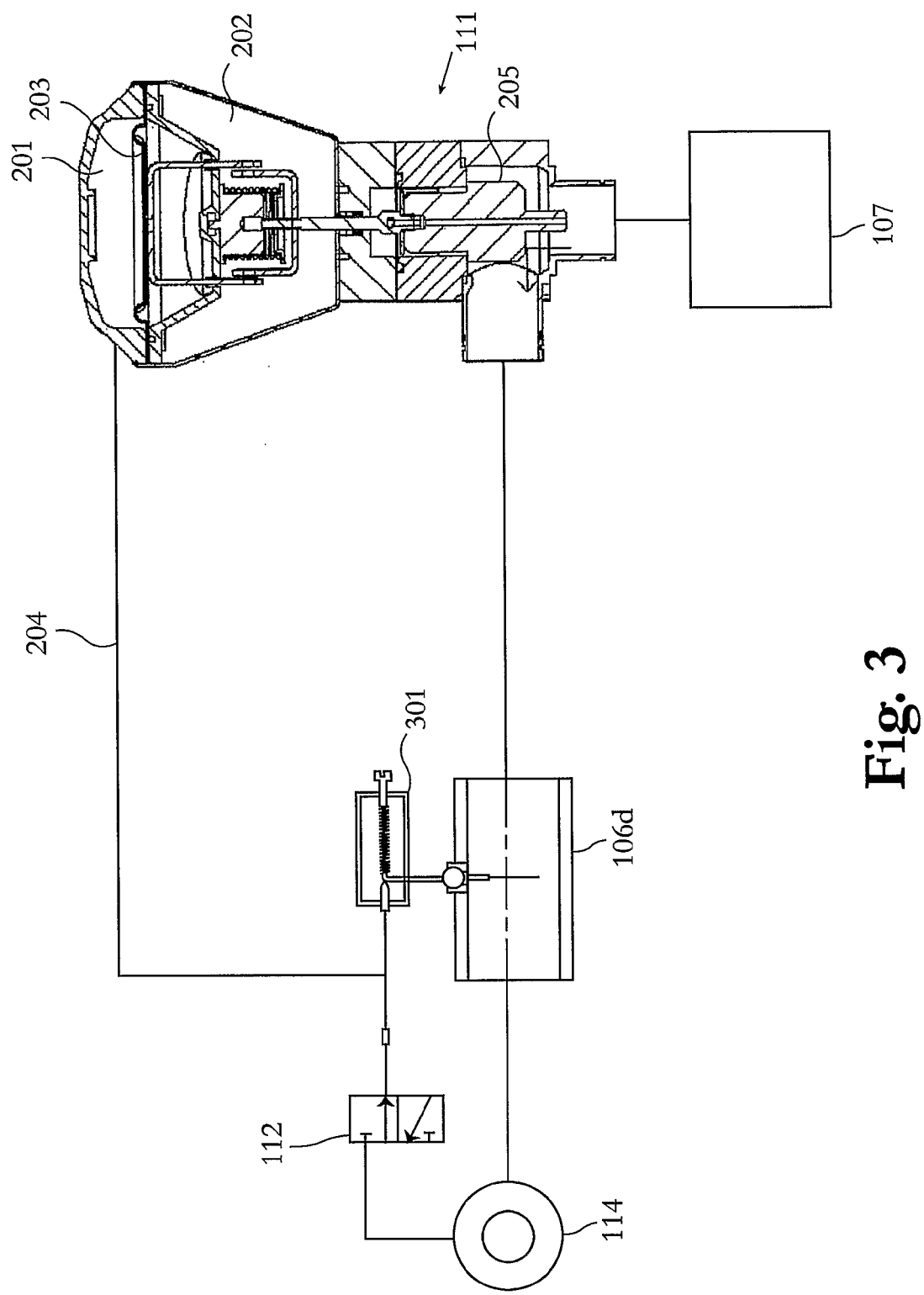
FIG. 3 is a schematic drawing of an alternative air flow regulation device of the invention.

Typically, the valve 111 is fully open during operation mode 1: milking, whereas the valve will at least partly close during operation modes 2 and 3: teat cleaning and cleaning of milking machine FIG. 3 shows an alternative embodiment of the air flow regulation device 8, wherein the vacuum sensor and fixed restrictor used in the device of FIG. 2 are replaced by an air flow sensor 301, which directly measures the air flow in the vacuum conduit 106d, which connects the milking machine 107 to the common vacuum source arrangement 114. The air flow sensor 301 controls the valve 111 in a similar manner as the vacuum sensor of the device in FIG. 2. Note that part of the vacuum conduit 106d is strongly enlarged in FIG. 3.

Nevertheless, it shall be appreciated that any other air flow regulation device known in the art or that will become known may be used in the present invention instead of the devices shown in FIGS. 2 and 3.

It will be obvious that the invention may be varied in a plurality of ways. Such variations are not to be regarded as a departure from the scope of the invention. All such modifications as would be obvious to one skilled in the art are intended to be included within the scope of the appended claims. Particularly, the common vacuum source arrangement 14 may comprise other vacuum conduit structures than a ring line.

The invention claimed is:

1. A system for milking animals, comprising:
   a plurality of milking machines,
   a common vacuum source arrangement, and
   a vacuum conduit system connecting each of said milking machines to said common vacuum source arrangement,
   wherein each of said milking machines is connected to said common vacuum source arrangement via an air flow regulation device,
   wherein each of said air flow regulation devices includes a flow sensor provided for sensing the air flow from the milking machine, to which it is connected, and a valve provided for controlling said air flow in response to the flow sensed by the flow sensor.

2. The system according to claim 1, wherein said common vacuum source arrangement comprises at least one vacuum pump and a header tank, and said vacuum conduit system is connected to said header tank.

3. The system according to claim 1, wherein each of said air flow regulation devices is provided to regulate the air flow from the milking machine, to which it is connected, to be lower than a threshold value.

4. The system according to claim 1, wherein each of said milking machines is arranged to operate in one state selected from a set of different states having different vacuum requirements independently of the state of operation of other ones of said milking machines.

5. The system according to claim 4, wherein said set of different states include milking, teat cup cleaning and milking machine cleaning states.

6. The system according to claim 1, wherein each of said air flow regulation devices comprises a fixed flow restrictor, a vacuum sensor arranged upstream of the fixed flow restrictor and provided for sensing the vacuum level, and a valve provided for controlling the air flow from the milking machine, to which it is connected, in response to the vacuum level sensed by the vacuum sensor.

7. The system according to claim 6, wherein said valve is a vacuum controlled valve provided upstream of said fixed flow restrictor and of said vacuum sensor.

8. The system according to claim 1, wherein said valve is provided upstream of said flow sensor.

9. The system according to claim 1, wherein said vacuum conduit system comprises at least one vacuum ring line connected to said common vacuum source arrangement and a plurality of milking machine connection conduits provided for connecting each milking machine to said vacuum ring line conduit.

10. The system according to claim 9, wherein each of said air flow regulation devices is arranged at a respective one of said milking machine connection conduits.

11. A method for milking animals in a system for milking animals comprising a plurality of milking machines, a common vacuum source arrangement, and a vacuum conduit system connecting each of said milking machines to said common vacuum source arrangement, wherein detecting the air flow from each of said milking machines and controlling the air flow from each of said milking machines is in response to the respective detected air flow.

12. The method according to claim 11, wherein the air flow from each of the milking machines is controlled to be lower than a threshold value.

* * * * *